US012790488B2

(12) United States Patent
Hatase et al.

(10) Patent No.: US 12,790,488 B2
(45) Date of Patent: Nov. 10, 2026

(54) POLYMER AND COATING COMPOSITION CONTAINING SAID POLYMER

(71) Applicant: DIC Corporation, Tokyo (JP)

(72) Inventors: Masaki Hatase, Ichihara (JP); Ryohei Shimizu, Ichihara (JP); Hideya Suzuki, Ichihara (JP)

(73) Assignee: DIC Corporation, Tokyo (JP)

( * ) Notice: Subject to any disclaimer, the term of this patent is extended or adjusted under 35 U.S.C. 154(b) by 895 days.

(21) Appl. No.: 17/788,089

(22) PCT Filed: Dec. 10, 2020

(86) PCT No.: PCT/JP2020/045965
§ 371 (c)(1),
(2) Date: Jun. 22, 2022

(87) PCT Pub. No.: WO2021/131726
PCT Pub. Date: Jul. 1, 2021

(65) Prior Publication Data

US 2023/0090038 A1 Mar. 23, 2023

(30) Foreign Application Priority Data

Dec. 25, 2019 (JP) ................................ 2019-233734

(51) Int. Cl.

| | |
|---|---|
| ***C08L 83/12*** | (2006.01) |
| ***C08G 77/46*** | (2006.01) |
| ***C09D 7/47*** | (2018.01) |
| ***C09D 183/12*** | (2006.01) |

(52) U.S. Cl.
CPC .............. *C08L 83/12* (2013.01); *C08G 77/46* (2013.01); *C09D 7/47* (2018.01); *C09D 183/12* (2013.01)

(58) Field of Classification Search
CPC ......... C08L 83/12; C09D 7/47; C09D 183/12; C08G 77/46
See application file for complete search history.

(56) References Cited

U.S. PATENT DOCUMENTS

| | | | |
|---|---|---|---|
| 5,177,167 | A | 1/1993 | Tone et al. |
| 2002/0103316 | A1 | 8/2002 | Tanaka et al. |
| 2003/0100675 | A1 | 5/2003 | Goetz et al. |
| 2003/0105228 | A1 | 6/2003 | Kawase et al. |

FOREIGN PATENT DOCUMENTS

| | | | |
|---|---|---|---|
| CN | 101910945 | A | 12/2010 |
| CN | 101910945 | A1 * | 12/2010 |
| CN | 103666006 | A | 3/2014 |
| CN | 105418864 | A | 3/2016 |
| JP | H02-019166 | A | 1/1990 |
| JP | 2001-288233 | A | 10/2001 |
| JP | 2003-226834 | A | 8/2003 |
| JP | 2016-117865 | A | 6/2016 |
| JP | 2018199765 | A * | 12/2018 |

OTHER PUBLICATIONS

Grubbs (Year: 2017).*
J.-N. Marsat et al., "Multicompartment micelles from silicone-based triphilic block copolymers," Colloid Polym Sci, Springer, Jun. 23, 2013, 7 pages.

* cited by examiner

*Primary Examiner* — Robert S Jones, Jr.
*Assistant Examiner* — Elizabeth Amato
(74) *Attorney, Agent, or Firm* — Troutman Pepper Locke LLP; James E. Armstrong, IV; Tanya Leavy

(57) ABSTRACT

Provided is a polymer functioning as a leveling agent that imparts high smoothness to a coating film. Specifically, a polymer containing a polymer block (A1) of a polymerizable monomer (a1) having a functional group represented by $—Si[OSi(R)_3]_n[R']_{3-n}$ (n is an integer of 1 to 3, each R independently represents an alkyl group having 1 to 3 carbon atoms, and each R' independently represents an alkyl group having 1 to 3 carbon atoms). Also provided are a coating composition, a resist composition, and an article containing the polymer.

23 Claims, No Drawings

POLYMER AND COATING COMPOSITION CONTAINING SAID POLYMER

TECHNICAL FIELD

The present invention relates to a polymer and a coating composition containing the polymer.

BACKGROUND ART

A leveling agent is added to smooth a coating film obtained by applying a coating composition such as a paint composition or a resist composition. Specifically, by adding the leveling agent to the coating composition, the leveling agent is oriented on the surface of the coating film to reduce the surface tension of the coating film, and an effect of smoothing the obtained coating film is obtained. In the coating film of which the surface is smoothed, occurrence of cissing and unevenness can be reduced.

The leveling agent is used in, for example, an automotive paint, and a paint composition containing the leveling agent can impart a high degree of smoothness to the surface of the obtained coating film, and can impart glossiness to the appearance of an automobile.

As the leveling agent used in the automotive paint, silicone-based leveling agents are proposed (PTL 1 and PTL 2).

The leveling agent is used in various applications, and is also used in, for example, a color resist composition used in preparation of a color filter to be used in a liquid crystal display. The preparation of the color filter generally includes a step of coating a glass substrate with a color resist composition by a coating method such as spin coating or slit coating, exposing a dried coating film using a mask, and then developing the exposed coating film to form a colored pattern. In this case, when the smoothness of the coating film is not good and the film thickness is uneven, or when coating unevenness, cissing, or the like occurs, color unevenness in pixel may occur.

By adding the leveling agent to the color resist composition, the smoothness of the obtained coating film can be improved, and the surface of pixels of red (R), green (G), and blue (B) and a black matrix (BM) formed between these pixels can exhibit a high degree of smoothness, and a color filter with less color unevenness can be obtained.

CITATION LIST

Patent Literature

PTL 1: JP-A-2003-226834
PTL 2: JP-A-2018-199765

SUMMARY OF INVENTION

Technical Problem

The silicone-based leveling agent disclosed in PTL 1 is a random polymer obtained by polymerizing a silicone monomer and a (meth)acrylate monomer by free radical polymerization, and a leveling effect is not sufficient because silicone sites are randomly arranged. In addition, the silicone-based leveling agent disclosed in PTL 2 contains, as an essential part, an organopolysiloxane chain having a large molecular weight, and a coating film obtained by the organopolysiloxane chain may be defective.

An object of the invention is to provide a polymer functioning as a leveling agent that imparts a high degree of smoothness to a coating film.

Solution to Problem

As a result of intensive studies to solve the above-mentioned problem, the inventors have found that a polymer containing a polymer block of a polymerizable monomer having a functional group represented by $—Si[OSi(R)_3]_n[R']_{3-n}$ exhibits a high leveling property suitable for resist applications, and have thus completed the invention.

That is, the invention relates to a polymer containing a polymer block (A1) of a polymerizable monomer (a1) having a functional group represented by $—Si[OSi(R)_3]_n[R']_{3-n}$ (n is an integer of 1 to 3, each R independently represents an alkyl group having 1 to 3 carbon atoms, and each R' independently represents an alkyl group having 1 to 3 carbon atoms).

Advantageous Effects of Invention

According to the invention, it is possible to provide a polymer functioning as a leveling agent that imparts a high degree of smoothness to a coating film.

DESCRIPTION OF EMBODIMENTS

Hereinafter, an embodiment of the invention will be described. The invention is not limited to the following embodiment, and can be implemented with appropriate modifications within the scope that does not impair the effect of the invention.

In the present description, the term "(meth)acrylate" refers to one or both of acrylate and methacrylate.

Polymer

The polymer according to the invention contains a polymer block (A1) of a polymerizable monomer (a1) having a functional group represented by $—Si[OSi(R)_3]_n[R']_{3-n}$ (n is an integer of 1 to 3, each R independently represents an alkyl group having 1 to 3 carbon atoms, and each R' independently represents an alkyl group having 1 to 3 carbon atoms).

The polymer block (A1) is a segment having a repeating structure derived from the polymerizable monomer (a1) having the functional group represented by $—Si[OSi(R)_3]_n[R']_{3-n}$ (n is an integer of 1 to 3, each R independently represents an alkyl group having 1 to 3 carbon atoms, and each R' independently represents an alkyl group having 1 to 3 carbon atoms). Here, regarding "having a repeating structure derived from the polymerizable monomer (a1)", the polymer block (A1) may has a repeating structure derived from another polymerizable monomer as long as the effect of the invention is not impaired. The polymer block (A1) preferably has the repeating structure derived from the polymerizable monomer (a1) in an amount of 80% by mass or more, 90% by mass or more, 95% by mass or more, 98% by mass or more, or 100% by mass.

In the invention, the term "polymerizable monomer" means a compound having a polymerizable unsaturated group, and examples of the polymerizable unsaturated group in the polymerizable monomer (a1) include C═C-containing groups such as a (meth)acryloyl group, a (meth)acryloyloxy group, a (meth)acryloylamino group, a vinyl ether group, an allyl group, a styryl group, and a maleimide group. Among these, a (meth)acryloyl group and a (meth)acryloyloxy group are preferable in terms of easy availability and good polymerization reactivity of raw materials.

In the polymerizable monomer (a1), the functional group represented by $—Si[OSi(R)_3]_n[R']_{3-n}$ is a functional group represented preferably by $—Si[OSi(R)_3]_3$, and more preferably $—Si[OSi(CH_3)_3]_3$. When the functional group represented by $—Si[OSi(R)_3]_n[R']_{3-n}$ is $—Si[OSi(CH_3)_3]_3$, with the polymer according to the invention, a high surface segregation ability can be obtained.

The polymerizable monomer (a1) is preferably a compound represented by the following formula (a1-1).

[Chem. 1]

(a1-1)

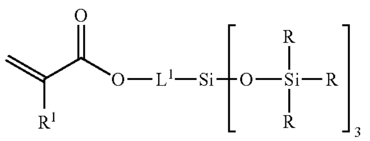

(In the formula (a1-1), each R independently represents an alkyl group having 1 to 3 carbon atoms, $R^1$ represents a hydrogen atom or a methyl group, and $L^1$ represents a divalent organic group or a single bond).

The divalent organic group represented by $L^1$ is preferably an alkylene group having 1 to 50 carbon atoms or an alkyleneoxy group having 1 to 50 carbon atoms.

Examples of the alkylene group having 1 to 50 carbon atoms represented by $L^1$ include a methylene group, an ethylene group, an n-propylene group, an n-butylene group, an n-pentylene group, an n-hexylene group, an n-heptylene group, an n-octylene group, an n-nonylene group, an n-decylene group, an n-dodecylene group, an isopropylene group, a 2-methylpropylene group, a 2-methylhexylene group, and a tetramethylethylene group.

The alkylene group having 1 to 50 carbon atoms represented by $L^1$ is preferably an alkylene group having 1 to 15 carbon atoms, more preferably an alkylene group having 1 to 5 carbon atoms, and still more preferably a methylene group, an ethylene group, an n-propylene group, or an isopropylene group.

The alkyleneoxy group having 1 to 50 carbon atoms represented by $L^1$ is, for example, a group in which $—CH_2—$ in the alkylene group is substituted with —O—.

The alkyleneoxy group having 1 to 50 carbon atoms represented by $L^1$ is preferably an alkyleneoxy group having 1 to 15 carbon atoms, more preferably an alkyleneoxy group having 1 to 8 carbon atoms, and still more preferably a methyleneoxy group, an ethyleneoxy group, a propyleneoxy group, an oxytrimethylene group, a butyleneoxy group, an oxytetramethylene group, a pentyleneoxy group, a heptyleneoxy group, or an octyleneoxy group.

When the divalent organic group represented by $L^1$ is an alkylene group having 1 to 50 carbon atoms or an alkyleneoxy group having 1 to 50 carbon atoms, a part of $—CH_2—$ of the divalent organic group may be substituted with a carbonyl group (—C(═O)—), a phenylene group, an amide bond, or a urethane bond, and the carbon atom may be further substituted with a hydroxy group or the like.

The functional group represented by $—Si[OSi(R)_3]_3$ of the compound represented by the formula (a1-1) is preferably $—Si[OSi(CH_3)_3]_3$, and the compound is represented by the following formula (a1-2).

[Chem. 2]

(a1-2)

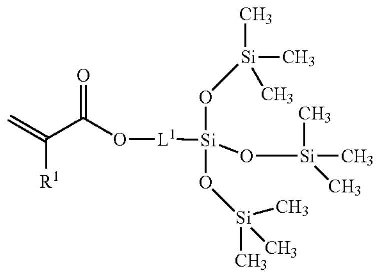

(In the formula (a1-2), $R^1$ represents a hydrogen atom or a methyl group, and $L^1$ represents a divalent organic group or a single bond).

The polymerizable monomer constituting the polymer block (A1) may be the polymerizable monomer (a1) having the functional group represented by $—Si[OSi(R)_3]_n[R']_{3-n}$, and the polymer block (A1) may be constituted of two or more polymerizable monomers (a1) having different structures from each other. In this case, the polymerization form of the polymer block (A1) is not particularly limited, and the polymer block (A1) may have a random polymer structure of two or more polymerizable monomers (a1) having different structures from each other, or may have a block polymer structure of two or more polymerizable monomers (a1) having different structures from each other.

The polymerizable monomer constituting the polymer block (A1) is preferably a single kind of polymerizable monomer (a1).

The polymerizable monomer (a1) can be produced by a known method, and a commercially available product may be used.

As a commercially available product of the polymerizable monomer (a1), for example, 3-(methacryloyloxy)propyltris (trimethylsiloxy)silane is commercially available.

In the polymer according to the invention, the content ratio of the polymer block (A1) is, for example, 5% by mass or more, and preferably 10% by mass or more, 15% by mass or more, 20% by mass or more, 30% by mass or more, 50% by mass or more, 60% by mass or more, or 65% by mass or more, with respect to the total amount of the polymer.

The upper limit of the content ratio of the polymer block (A1) is not particularly limited, and is, for example, 95% by mass or less, preferably 90% by mass or less, more preferably 85% by mass or less, and still more preferably 75% by mass or less, with respect to the total amount of the polymer.

The content ratio of the polymer block (A1) can be adjusted by a raw material charging ratio of the polymerizable monomer (a1) for producing the polymer according to the invention.

The content of the functional group represented by $—Si[OSi(R)_3]_n[R']_{3-n}$ in the polymer according to the invention is, for example, 5% by mass to 95% by mass, preferably 10% by mass to 90% by mass, more preferably 15% by mass to 85% by mass, still more preferably 20% by mass to 65% by mass, and particularly preferably 45% by mass to 65% by mass.

The content of the functional group represented by $—Si[OSi(R)_3]_n[R']_{3-n}$ can be adjusted by the raw material charging ratio of the polymerizable monomer (a1) used in producing the polymer according to the invention.

The polymer according to the invention preferably further contains a polymer block (A2) of a polymerizable monomer (a2) having one or more groups selected from an alkyl group having 1 to 18 carbon atoms, an aromatic group having 6 to 18 carbon atoms, and a group containing a polyoxyalkylene chain. The polymer block (A2) can impart compatibility to the polymer according to the invention.

The polymer block (A2) is a segment having a repeating structure derived from the polymerizable monomer (a2) having one or more groups selected from the alkyl group having 1 to 18 carbon atoms, the aromatic group having 6 to 18 carbon atoms, and the group containing a polyoxyalkylene chain.

In the invention, the term "polymerizable monomer" means a compound having a polymerizable unsaturated group, and the polymerizable unsaturated group in the polymerizable monomer (a2) may be a group having a vinyl group. Examples of the polymerizable unsaturated group include a (meth)acryloyl group, a (meth)acryloyloxy group, a (meth)acryloylamino group, a vinyl ether group, an allyl group, a styryl group, and a maleimide group. Among these, a (meth)acryloyl group and a (meth)acryloyloxy group are preferable in terms of easy availability and good polymerization reactivity of raw materials.

The alkyl group having 1 to 18 carbon atoms in the polymerizable monomer (a2) may be any of a linear alkyl group, a branched alkyl group, and a cyclic alkyl group, and specific examples of the alkyl group include a methyl group, an ethyl group, a n-propyl group, an isopropyl group, an n-butyl group, a t-butyl group, an n-hexyl group, a cyclohexyl group, an n-octyl group, and a hexadecyl group.

The alkyl group having 1 to 18 carbon atoms in the polymerizable monomer (a2) may be substituented with one or more substituents such as a hydroxy group, a phenyl group, and a phenoxy group.

The alkyl group having 1 to 18 carbon atoms in the polymerizable monomer (a2) includes, for example, a hydroxyalkyl group having 1 to 18 carbon atoms, a phenylalkyl group having 7 to 18 carbon atoms, and a phenoxyalkyl group having 7 to 18 carbon atoms.

The alkyl group having 1 to 18 carbon atoms in the polymerizable monomer (a2) is preferably an alkyl group having 1 to 8 carbon atoms.

Examples of the aromatic group having 6 to 18 carbon atoms in the polymerizable monomer (a2) include a phenyl group, a naphthyl group, an anthracene-1-yl group, and a phenanthrene-1-yl group.

The aromatic group having 6 to 18 carbon atoms in the polymerizable monomer (a2) may be further substituted with a substituent such as a hydroxy group, an alkyl group, or an alkoxy group, and includes, for example, a phenyl group substituted with an alkyl group having 1 to 6 carbon atoms.

The group containing a polyoxyalkylene chain in the polymerizable monomer (a2) is a monovalent group having a repeating portion of oxyalkylene or a divalent linking group having a repeating portion of oxyalkylene.

When the polymerizable unsaturated group in the polymerizable monomer (a2) is a (meth)acryloyl group, the polymerizable monomer (a2) having the group containing a polyoxyalkylene chain is, for example, a compound represented by the following formula (a2-poa1) or (a2-poa2).

[Chem. 3]

(a2-poa1)

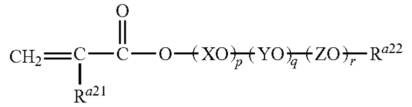

(a2-poa2)

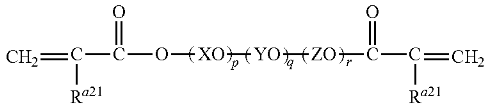

(In the formulae (a2-poa1) and (a2-poa2), each $R^{a21}$ independently represents a hydrogen atom or a methyl group, $R^{a22}$ represents a hydrogen atom or an alkyl group having 1 to 18 carbon atoms, p is an integer of 0 or more, q is an integer of 0 or more, r is an integer of 0 or more, and p+q+r represents an integer of 1 or more, and each of X, Y, and Z independently represents an alkylene group having 1 to 6 carbon atoms).

In the formulae (a2-poa1) and (a2-poa2), a group represented by $-(XO)_p-(YO)_q-(ZO)_r-R^{a22}$ and a group represented by $-(XO)_p-(YO)_q-(ZO)_r-$ correspond to the group containing a polyoxyalkylene chain.

Examples of the polymerizable monomer (a2) having the alkyl group having 1 to 18 carbon atoms and the polymerizable unsaturated group being a (meth)acryloyl group include: an alkyl (meth)acrylate having 1 to 18 carbon atoms such as methyl (meth)acrylate, ethyl (meth)acrylate, n-propyl (meth)acrylate, isopropyl (meth)acrylate, n-butyl (meth) acrylate, s-butyl (meth)acrylate, isobutyl (meth)acrylate, t-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, decyl (meth)acrylate, dodecyl (meth)acrylate, stearyl (meth)acrylate, and isostearyl (meth)acrylate; and a bridged cyclic alkyl (meth)acrylate having 1 to 18 carbon atoms such as dicyclopentanyloxyethyl (meth)acrylate, isobornyloxyethyl (meth)acrylate, isobornyl (meth)acrylate, adamantyl (meth)acrylate, dimethyladamantyl (meth)acrylate, dicyclopentanyl (meth)acrylate, and dicyclopentenyl (meth)acrylate.

Examples of the polymerizable monomer (a2) having a hydroxyalkyl group having 1 to 18 carbon atoms and the polymerizable unsaturated group being a (meth)acryloyl group include 2-hydroxyethyl (meth)acrylate, 2-hydroxypropyl (meth)acrylate, 2-hydroxybutyl (meth)acrylate, 4-hydroxyl (meth)acrylate, 1,4-cyclohexanedimethanol mono (meth)acrylate, and 2,3-dihydroxypropyl (meth)acrylate.

Examples of the polymerizable monomer (a2) having a phenylalkyl group having 7 to 18 carbon atoms or a phenoxyalkyl group having 7 to 18 carbon atoms and the polymerizable unsaturated group being a (meth)acryloyl group include benzyl (meth)acrylate, 2-phenoxymethyl (meth)acrylate, 2-phenoxyethyl (meth)acrylate, and 2-hydroxy-3-phenoxypropyl (meth)acrylate.

Examples of the polymerizable monomer (a2) having the group containing a polyoxyalkylene chain and the polymerizable unsaturated group being a (meth)acryloyl group include polypropylene glycol mono(meth)acrylate, polyethylene glycol mono(meth)acrylate, polytrimethylene glycol mono(meth)acrylate, polytetramethylene glycol mono (meth)acrylate, poly(ethylene glycol/propylene glycol)

mono(meth)acrylate, polyethylene glycol/polypropylene glycol mono(meth)acrylate, poly(ethylene glycol/tetramethylene glycol) mono(meth)acrylate, polyethylene glycol/polytetramethylene glycol mono(meth)acrylate, poly(propylene glycol/tetramethylene glycol) mono(meth)acrylate, polypropylene glycol/polytetramethylene glycol mono(meth)acrylate, poly(propylene glycol/1,2-butylene glycol) mono(meth)acrylate, polypropylene glycol/poly 1,2-butylene glycol mono(meth)acrylate, poly(ethylene glycol/1,2-butylene glycol) mono(meth)acrylate, polyethylene glycol/poly 1,2-butylene glycol mono(meth)acrylate, poly(tetraethylene glycol/1,2-butylene glycol) mono(meth)acrylate, polytetraethylene glycol/poly 1,2-butylene glycol mono(meth)acrylate, poly 1,2-butylene glycol mono(meth)acrylate, poly(ethylene glycol/trimethylene glycol) mono(meth)acrylate, polyethylene glycol/polytrimethylene glycol mono(meth)acrylate, poly(propylene glycol/trimethylene glycol) mono(meth)acrylate, polypropylene glycol/polytrimethylene glycol mono(meth)acrylate, poly(trimethylene glycol/tetramethylene glycol) mono(meth)acrylate, polytrimethylene glycol/polytetramethylene glycol mono(meth)acrylate, poly(1,2-butylene glycol/trimethylene glycol) mono(meth)acrylate, poly 1,2-butylene glycol/polytrimethylene glycol mono(meth)acrylate, 2-hydroxyethyl (meth)acrylate, 2-hydroxypropyl (meth)acrylate, 2-hydroxybutyl (meth)acrylate, 4-hydroxybutyl (meth)acrylate, poly(1,2-butylene glycol/tetramethylene glycol) mono(meth)acrylate, and poly 1,2-butylene glycol/polytetramethylene glycol mono(meth)acrylate.

Note that the above-mentioned "poly(ethylene glycol/propylene glycol)" means a random copolymer of ethylene glycol and propylene glycol, and the above-mentioned "polyethylene glycol/polypropylene glycol" means a block copolymer of ethylene glycol and propylene glycol.

Examples of the polymerizable monomer (a2) having the alkyl group having 1 to 18 carbon atoms and the polymerizable unsaturated group being a vinyl ether group include: alkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, 2-ethylhexyl vinyl ether, and cyclohexyl vinyl ether; and cycloalkyl vinyl ether, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, 1-hydroxypropyl vinyl ether, 2-hydroxypropyl vinyl ether, 1-hydroxybutyl vinyl ether, 2-hydroxybutyl vinyl ether, 3-hydroxybutyl vinyl ether, 3-hydroxy-2-methylpropyl vinyl ether, 4-hydroxy-2-methylbutyl vinyl ether, 4-hydroxycyclohexyl vinyl ether, and cyclohexane-1,4-dimethanol monovinyl ether.

Examples of the polymerizable monomer (a2) having the alkyl group having 1 to 18 carbon atoms and the polymerizable unsaturated group being an allyl group include 2-hydroxyethyl allyl ether, 4-hydroxybutyl allyl ether, and glycerol monoallyl ether.

Examples of the polymerizable monomer (a2) having the aromatic group having 6 to 18 carbon atoms include styrene, α-methylstyrene, p-methylstyrene, and p-methoxystyrene.

Examples of the polymerizable monomer (a2) having the alkyl group having 1 to 18 carbon atoms and the polymerizable unsaturated group being a (meth)acryloylamino group include N,N-dimethylacrylamide, N,N-diethylacrylamide, N-isopropylacrylamide, diacetoneacrylamide, and acryloylmorpholine.

Examples of the polymerizable monomer (a2) having the alkyl group having 1 to 18 carbon atoms and the polymerizable unsaturated group being a maleimide group include methylmaleimide, ethylmaleimide, propylmaleimide, butylmaleimide, hexylmaleimide, octylmaleimide, dodecylmaleimide, stearylmaleimide, and cyclohexylmaleimide.

The polymerizable monomer (a2) is preferably a compound represented by the following formula (a2-1) or (a2-2). These compounds can impart high compatibility when the polymer according to the invention is used as a leveling agent.

[Chem. 4]

(a2-1)

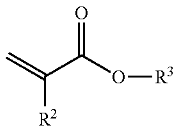

(a2-2)

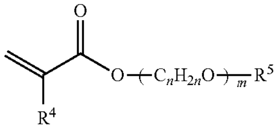

(In the formulae (a2-1) and (a2-2), $R^2$ represents a hydrogen atom or a methyl group, $R^3$ represents an alkyl group having 1 to 18 carbon atoms, $R^4$ represents a hydrogen atom or a methyl group, $R^5$ represents a hydrogen atom or an alkyl group having 1 to 18 carbon atoms, n is an integer of 1 to 4, and m is an integer of 1 to 100).

In the formulae (a2-1) and (a2-2), the alkyl group having 1 to 18 carbon atoms represented by $R^3$ and $R^5$ is preferably an alkyl group having 1 to 8 carbon atoms.

In the formula (a2-2), m is preferably an integer of 2 to 50, and more preferably an integer of 3 to 20.

The polymerizable monomer (a2) is preferably a compound represented by the following formula (a2-3).

[Chem. 5]

(a2-3)

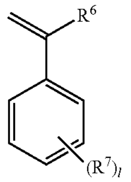

((In the formula (a2-3), $R^6$ represents a hydrogen atom or a methyl group, each $R^7$ independently represents an alkyl group having 1 to 6 carbon atoms or an alkoxy group having 1 to 6 carbon atoms, and L is an integer of 0 to 5).

The polymerizable monomer (a2) can be produced by a known method.

In addition, as the polymerizable monomer (a2), a commercially available product may be used. Examples of the commercially available product of the polymerizable monomer (a2) having the group containing a polyoxyalkylene chain and the polymerizable unsaturated group being a (meth)acryloyl group include: "NK ESTER M-20G", "NK ESTER M-40G", "NK ESTER M-90G", "NK ESTER M-230G", "NK ESTER AM-90G", "NK ESTER AMP-10G", "NK ESTER AMP-20G", and "NK ESTER AMP-60G" manufactured by Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400", "BLEMMER PME-4000", "BLEMMER PP-1000", "BLEMMER PP-500", "BLEMMER PP-800", "BLEMMER 70PEP-350B", "BLEMMER 55PET-800", "BLEMMER 50POEP-800B", "BLEMMER 10PPB-500B", "BLEMMER NKH-5050", "BLEMMER AP-400", and "BLEMMER AE-350" manufactured by NOF CORPORATION.

A monomer constituting the polymer block (A2) may be the polymerizable monomer (a2) having one or more groups selected from the alkyl group having 1 to 18 carbon atoms, the aromatic group having 6 to 18 carbon atoms, and the group containing a polyoxyalkylene chain, and the polymer block (A2) may be constituted of two or more polymerizable monomers (a2) having different structures from each other. In this case, the polymerization form of the polymer block (A2) is not particularly limited, and the polymer block (A2) may have a random polymer structure of two or more polymerizable monomers (a2) having different structures from each other, or may have a block polymer structure of two or more polymerizable monomers (a2) having different structures from each other.

The polymerizable monomer constituting the polymer block (A2) is preferably a single kind of polymerizable monomer (a2).

The mass ratio of the polymer block (A1) to the polymer block (A2) in the polymer according to the invention is, for example, polymer block (A1):polymer block (A2)=5:95 to 95:5, and preferably polymer block (A1):polymer block (A2)=20:80 to 90:10.

The polymer according to the invention may contain the polymer block (A1) and optionally the polymer block (A2), and may contain a polymer block of a polymerizable monomer other than the polymerizable monomer (a1) and the polymerizable monomer (a2) as long as the effect of the invention is not impaired.

The polymer according to the invention is preferably a block copolymer containing the polymer block (A1) and the polymer block (A2), more preferably a block copolymer consisting essentially of the polymer block (A1) and the polymer block (A2), and still more preferably a block copolymer consisting only of the polymer block (A1) and the polymer block (A2). The expression "essentially" as used herein means that the total content of the polymer block (A1) and the polymer block (A2) in the polymer according to the invention is 80% by mass or more, 90% by mass or more, 95% by mass or more, or 99% by mass or more.

The polymer according to the invention preferably is free of a fluorine atom. When the polymer is a fluorine atom-free polymer, the accumulation property with respect to the environment is reduced, and an environmental load can be reduced.

When the polymer according to the invention is a block copolymer consisting of the polymer block (A1) and the polymer block (A2), the polymer according to the invention can be a polymer free of a fluorine atom.

The polymer according to the invention may contain at least one polymer block (A1). For example, when the polymer according to the invention is a block copolymer containing the polymer block (A1) and the polymer block (A2), the number of each of the polymer blocks and the bonding order of the polymer blocks are not particularly limited.

The polymer according to the invention is preferably a diblock copolymer in which one polymer block (A1) and one polymer block (A2) are bonded to each other.

The number average molecular weight (Mn) of the polymer according to the invention is preferably in a range of 1,000 to 500,000, more preferably in a range of 2,000 to 100,000, still more preferably in a range of 2,000 to 40,000, and particularly preferably in a range of 4,000 to 40,000.

The weight average molecular weight (Mw) of the polymer according to the invention is preferably in a range of 1,000 to 500,000, more preferably in a range of 2,000 to 100,000, still more preferably in a range of 2,000 to 40,000, and particularly preferably in a range of 4,000 to 40,000.

The dispersibility (Mw/Mn) of the polymer according to the invention is preferably in a range of 1.0 to 2.0, more preferably in a range of 1.0 to 1.8, and still more preferably in a range of 1.0 to 1.5.

In the invention, the weight average molecular weight (Mw) and the number average molecular weight (Mn) are values in terms of polystyrene based on gel permeation chromatography (GPC) measurement. Note that measurement conditions for the GPC are as follows.

GPC Measurement Conditions

Measurement device: high-speed GPC device "HLC-8320GPC" manufactured by TOSOH CORPORATION Column: "TSK GUARDCOLUMN SuperHZ-L" manufactured by TOSOH CORPORATION+"TSK gel SuperHZM-N" manufactured by TOSOH CORPORATION+"TSK gel SuperHZM-N" manufactured by TOSOH CORPORATION+"TSK gel SuperHZM-N" manufactured by TOSOH CORPORATION+"TSK gel SuperHZM-N" manufactured by TOSOH CORPORATION Detector: differential refractometer (RI)

Data processing: "EcoSEC Data Analysis Version 1.07" manufactured by TOSOH CORPORATION Column temperature: 40° C.

Developing solvent: tetrahydrofuran

Flow rate: 0.35 mL/min

Measurement sample: 7.5 mg of a sample is dissolved in 10 ml of tetrahydrofuran, and the resulting solution is filtered through a microfilter to prepare a measurement sample.

Sample injection amount: 20 μl

Standard sample: the following monodisperse polystyrene having a known molecular weight is used in accordance with a measurement manual of the above-mentioned "HLC-8320GPC".

Monodisperse Polystyrene

"A-300" manufactured by TOSOH CORPORATION
"A-500 manufactured by TOSOH CORPORATION
"A-1000" manufactured by TOSOH CORPORATION
"A-2500" manufactured by TOSOH CORPORATION
"A-5000" manufactured by TOSOH CORPORATION
"F-1" manufactured by TOSOH CORPORATION
"F-2" manufactured by TOSOH CORPORATION
"F-4" manufactured by TOSOH CORPORATION
"F-10" manufactured by TOSOH CORPORATION
"F-20" manufactured by TOSOH CORPORATION
"F-40" manufactured by TOSOH CORPORATION
"F-80" manufactured by TOSOH CORPORATION
"F-128" manufactured by TOSOH CORPORATION
"F-288" manufactured by TOSOH CORPORATION When the polymer according to the invention is a block copolymer containing the polymer block (A1) and the polymer block (A2), the block copolymer can be produced by, for example, living polymerization such as living radical polymerization or living anion polymerization of a reaction raw material containing the polymerizable monomer (a1) and the polymerizable monomer (a2).

Note that the "reaction raw material" as used herein means a raw material constituting the polymer according to the invention, and does not include a raw material that does not constitute the polymer according to the invention, such as a solvent or a catalyst.

For example, in the living radical polymerization, dormant species whose active polymerization terminal is protected by an atom or an atomic group reversibly generate a radical and react with a monomer, whereby a growth reaction proceeds, and a block polymer can be obtained by reacting with a second monomer that is sequentially added without losing the activity of a growth terminal even when a first monomer is consumed. Examples of such living radical polymerization include atomic transfer radical polymerization (ATRP), reversible addition-fragmentation radical polymerization (RAFT), nitroxide-mediated radical polymerization (NMP), and organic tellurium-mediated radical polymerization (TERP). Among these, the method to be used is not particularly limited, and ATRP is preferable from the viewpoint of ease of control and the like. In the ATRP, polymerization is performed using an organic halide or a sulfonyl halide compound as a polymerization initiator and using a metal complex consisting of a transition metal compound and a ligand as a catalyst.

Specific examples of the polymerization initiator that can be used in the ATRP include 1-phenylethyl chloride, 1-phenylethyl bromide, chloroform, carbon tetrachloride, 2-chloropropionitrile, α,α'-dichloroxylene, α,α'-dibromoxylene, hexakis(α-bromomethyl)benzene, and an alkyl ester having 1 to 6 carbon atoms of a 2-halogenated carboxylic acid having 1 to 6 carbon atoms (for example, a 2-chloropropionic acid, a 2-bromopropionic acid, a 2-chloroisobutyric acid, and a 2-bromoisobutyric acid).

Specific examples of the alkyl ester having 1 to 6 carbon atoms of the 2-halogenated carboxylic acid having 1 to 6 carbon atoms include methyl 2-chloropropionate, ethyl 2-chloropropionate, methyl 2-bromopropionate, and ethyl 2-bromoisobutyrate.

The transition metal compound that can be used in the ATRP is represented by $M^{n+}X_n$.

The transition metal $M^{n+}$ in the transition metal compound represented by $M^{n+}X_n$ can be selected from the group consisting of $Cu^{+}$, $Cu^{2+}$, $Fe^{2+}$, $Fe^{3+}$, $Ru^{2+}$, $Ru^{3+}$, $Cr^{2+}$, $Cr^{3+}$, $Mo^{0}$, $Mo^{+}$, $Mo^{2+}$, $Mo^{3+}$, $W^{2+}$, $W^{3+}$, $Rh^{3+}$, $Rh^{4+}$, $Co^{+}$, $Co^{2+}$, $Re^{2+}$, $Re^{3+}$, $Ni^{0}$, $Ni^{+}$, $Mn^{3+}$, $Mn^{4+}$, $V^{2+}$, $V^{3+}$, $Zn^{+}$, $Zn^{2+}$, $Au^{+}$, $Au^{2+}$, $Ag^{+}$, and $Ag^{2+}$ X in the transition metal compound represented by $M^{n+}X_n$ can be selected from the group consisting of a halogen atom, an alkoxyl group having 1 to 6 carbon atoms, $(SO_4)_{1/2}$, $(PO_4)_{1/3}$, $(HPO_4)_{1/2}$, $(H_2PO_4)$, triflate, hexafluorophosphate, methanesulfonate, arylsulfonate (preferably benzenesulfonate or toluenesulfonate), $SeR^{11}$, CN, and $R^{12}COO$. Here, $R^{11}$ represents an aryl group or a linear or branched alkyl group having 1 to 20 carbon atoms (preferably 1 to 10 carbon atoms), and $R^{12}$ represents a hydrogen atom or a linear or branched alkyl group having 1 to 6 carbon atoms (preferably a methyl group) which may be substituted 1 to 5 times with halogen (preferably 1 to 3 times with fluorine or chlorine).

In the transition metal compound represented by $M^{n+}X_n$, n represents a formal charge on the metal and is an integer of 0 to 7.

Examples of a ligand compound capable of coordinate-bonding to the transition metal in the transition metal compound include: a compound having a ligand containing one or more nitrogen atoms, oxygen atoms, phosphorus atoms, or sulfur atoms that are capable of coordinating with the transition metal via a σ bond; a compound having a ligand containing two or more carbon atoms capable of coordinating with the transition metal via a π bond; and a compound having a ligand capable of coordinating with the transition metal via a μ bond or an η bond.

The above-mentioned transition metal complex is not particularly limited, and is preferably transition metal complexes of Groups 7, 8, 9, 10, and 11, and more preferably complexes of zero-valent copper, monovalent copper, divalent ruthenium, divalent iron, and divalent nickel.

Specific examples of the catalyst that can be used in the ATRP include, when a central metal is copper, a complex with a ligand such as 2,2'-bipyridyl and a derivative thereof, 1,10-phenanthroline and a derivative thereof, and polyamine such as tetramethylethylenediamine, pentamethyldiethylenetriamine, and hexamethyltris(2-aminoethyl)amine. In addition, examples of a divalent ruthenium complex include dichlorotris(triphenylphosphine) ruthenium, dichlorotris (tributylphosphine) ruthenium, dichloro(cyclooctadiene) ruthenium, dichlorobenzene ruthenium, dichloro p-cymene ruthenium, dichloro(norbornadiene) ruthenium, cis-dichlorobis(2,2'-bipyridine) ruthenium, dichlorotris(1,10-phenanthroline) ruthenium, and carbonylchlorohydridotris (triphenylphosphine) ruthenium. Further, examples of a divalent iron complex include a bistriphenylphosphine complex and a triazacyclononane complex.

In the living radical polymerization, a solvent is preferably used.

Examples of the solvent used in the living radical polymerization include: ester solvents such as ethyl acetate, butyl acetate, and propylene glycol monomethyl ether acetate; ether solvents such as diisopropyl ether, dimethoxyethane, and diethylene glycol dimethyl ether; halogen solvents such as dichloromethane and dichloroethane; aromatic solvents such as toluene and xylene; ketone solvents such as methyl ethyl ketone, methyl isobutyl ketone, and cyclohexanone; alcohol solvents such as methanol, ethanol, and isopropanol; and aprotic polar solvents such as dimethylformamide and dimethyl sulfoxide.

The above-mentioned solvents may be used alone or in combination of two or more kinds thereof.

When the polymer according to the invention is a block copolymer containing the polymer block (A1) and the polymer block (A2) (hereinafter, the copolymer is referred to as "the block copolymer according to the invention"), the block copolymer according to the invention can be produced by, for example, the following method 1 or 2.

Method 1: A method in which a polymerizable monomer (a1) is subjected to living radical polymerization (preferably atomic transfer radical polymerization) in the presence of a polymerization initiator, a transition metal compound, a ligand compound capable of coordinate-bonding to the transition metal, and a solvent to obtain a polymer block (A1), and then a polymerizable monomer (a2) is added to the reaction system, i.e., to the polymer block (A1), to further cause living radical polymerization (preferably atomic transfer radical polymerization) of the polymerizable monomer (a2).

Method 2: A method in which a polymerizable monomer (a2) is subjected to living radical polymerization (preferably atomic transfer radical polymerization) in the presence of a polymerization initiator, a transition metal compound, a ligand compound capable of coordinate-bonding to the transition metal, and a solvent to obtain a polymer block (A2), and then a polymerizable monomer (a1) is added to the reaction system, i.e., to the polymer block (A2), to further cause living radical polymerization (preferably atomic transfer radical polymerization) of the polymerizable monomer (a1).

The charge ratio (mass) of the polymerizable monomer (a1) to the polymerizable monomer (a2) in producing the block copolymer according to the invention is, for example, polymerizable monomer (a1):polymerizable monomer (a2) =5:95 to 95:5, and preferably polymerizable monomer (a1): polymerizable monomer (a2)=20:80 to 90:10.

The polymerization temperature in the living radical polymerization is preferably in a range of room temperature to 120° C.

When the block copolymer according to the invention is produced by the living radical polymerization, a metal derived from the transition metal compound used in the polymerization may remain in the obtained block copolymer. The metal remaining in the obtained block copolymer may be removed by using activated alumina or the like after the polymerization is completed.

Coating Composition

The polymer according to the invention can be suitably used as a leveling agent for a coating composition, and the coating composition according to the invention contains the polymer according to the invention. Since the polymer according to the invention can be used as a fluorine atom-free leveling agent containing no fluorine atom, the polymer according to the invention is a leveling agent having a low accumulation property with respect to the environment and a small environmental load.

The content of the polymer according to the invention contained in the coating composition according to the invention varies depending on the type of a base resin, a coating method, a target film thickness, and the like, and is preferably 0.0001 parts by mass to 10 parts by mass, more preferably 0.001 parts by mass to 5 parts by mass, and still more preferably 0.01 parts by mass to 2 parts by mass with respect to 100 parts by mass of a solid content of the coating composition. When the content of the polymer according to the invention is within the above-mentioned range, the surface tension can be sufficiently reduced, a desired leveling property can be obtained, and the occurrence of defects such as foaming during coating can be prevented.

An application of the coating composition according to the invention is not particularly limited, and the coating composition according to the invention can be used in any application as long as the leveling property is required. The coating composition according to the invention can be used as, for example, various paint compositions or photosensitive resin compositions.

When the coating composition according to the invention is used as a paint composition, examples of the paint composition include: a paint using a natural resin such as a petroleum resin paint, a shellac paint, a rosin-based paint, a cellulose-based paint, a rubber-based paint, a lacquer paint, a cashew resin paint, and an oily vehicle paint; and a paint using a synthetic resin such as a phenol resin paint, an alkyd resin paint, an unsaturated polyester resin paint, an amino resin paint, an epoxy resin paint, a vinyl resin paint, an acrylic resin paint, a polyurethane resin paint, a silicone resin paint, and a fluororesin paint.

By adding the polymer according to the invention to the above-mentioned paint composition, the smoothness can be imparted to the obtained coating film.

If necessary, the following can be appropriately added to the paint composition: a colorant such as a pigment, a dye, and carbon; an inorganic powder such as silica, titanium oxide, zinc oxide, aluminum oxide, zirconium oxide, calcium oxide, and calcium carbonate; an organic fine powder such as a higher fatty acid, a polyacrylic resin, and polyethylene; and various additives such as a light resistance improver, a weather resistance improver, a heat resistance improver, an antioxidant, a thickener, and an anti-settling agent.

The coating method for the coating composition according to the invention may be any known coating method, and examples of the coating method include methods using a slit coater, a slit and spin coater, a spin coater, a roll coater, electrostatic coating, a bar coater, a gravure coater, a die coater, a knife coater, an inkjet, dipping coating, spray coating, shower coating, screen printing, gravure printing, offset printing, and reverse coating.

In the photosensitive resin compositions, physical properties such as solubility, viscosity, transparency, refractive index, conductivity, and ion permeability of the resin change by irradiation with light such as visible light or ultraviolet light.

Also among the photosensitive resin compositions, a resist composition (a photoresist composition, a color resist composition for a color filter, or the like) is required to have a high leveling property. The resist composition is usually applied to, by spin coating, a silicon wafer or a glass substrate on which various metals are deposited so as to have a thickness of about 1 μm to 2 μm. In this case, if the film thickness of the coating fluctuates or coating unevenness occurs, there are problems that linearity or reproducibility of a pattern decreases and a resist pattern having a target accuracy cannot be obtained. Moreover, in addition to these problems, there are also various problems involved in leveling such as dripping marks, overall unevenness, and a bead phenomenon in which an edge portion becomes thicker than a central portion.

In the coating composition according to the invention, the polymer according to the invention exhibits a high leveling property and can form a uniform coating film (a cured product), and therefore, the problems as described above can be solved when the coating composition according to the invention is used as a resist composition.

When the coating composition according to the invention is used as a photoresist composition, the photoresist composition contains an alkali-soluble resin, a radiation sensitive substance (a photosensitive substance), a solvent, and the like, in addition to the polymer according to the invention.

The alkali-soluble resin contained in the photoresist composition is a resin soluble in an alkaline solution which is a developing solution used at the time of patterning the resist. Examples of the alkali-soluble resin include: a novolak resin obtained by condensing an aromatic hydroxy compound derivative such as phenol, cresol, xylenol, resorcinol, fluoroglycinol, and hydroquinone with an aldehyde compound such as formaldehyde, acetaldehyde, and benzaldehyde; a polymer or a copolymer of a vinylphenol compound derivative such as o-vinylphenol, m-vinylphenol, p-vinylphenol, and α-methylvinylphenol; a polymer or a copolymer based on (meth)acrylic acids such as acrylic acid, methacrylic acid, and hydroxyethyl (meth)acrylate; polyvinyl alcohol; a modified resin obtained by introducing a radioactive ray sensitive group such as a quinonediazide group, a naphthoquinoneazide group, an aromatic azide group, and an aromatic cinnamoyl group through a part of hydroxy groups of these various resins; and a urethane resin having an acidic group in the molecule, such as carboxylic acid and sulfonic acid.

These alkali-soluble resins may be used alone or in combination of two or more kinds thereof.

The radiation sensitive substance contained in the photoresist composition is a substance that changes the solubility of the alkali-soluble resin in a developing solution by irradiation with an energy ray such as an ultraviolet ray, a far ultraviolet ray, an excimer laser light, an X-ray, an electron beam, an ion beam, a molecular beam, and a T-ray.

Examples of the radiation sensitive substance include a quinonediazide compound, a diazo compound, an azide compound, an onium salt compound, a halogenated organic compound, a mixture of a halogenated organic compound and an organometallic compound, an organic acid ester compound, an organic acid amide compound, an organic acid imide compound, and a poly(olefin sulfone) compound.

Examples of the quinonediazide compound include 1,2-benzoquinoneazide-4-sulfonic acid ester, 1,2-naphthoquinonediazide-4-sulfonic acid ester, 1,2-naphthoquinonediazide-5-sulfonic acid ester, 2,1-naphthoquinonediazide-4-sulfonic acid ester, 2,1-naphthoquinonediazide-5-sulfonic acid ester, and sulfonic acid chloride of a quinonediazide derivative such as 1,2-benzoquinoneazide-4-sulfonic acid chloride, 1,2-naphthoquinonediazide-4-sulfonic acid chloride, 1,2-naphthoquinonediazide-5-sulfonic acid chloride, 2,1-naphthoquinonediazide-4-sulfonic acid chloride, and 2,1-naphthoquinonediazide-5-sulfonic acid chloride.

Examples of the diazo compound include a salt of a condensate of p-diazodiphenylamine and formaldehyde or acetaldehyde, a diazo resin inorganic salt which is a reaction product of a hexafluorophosphate, a tetrafluoroborate, a perchlorate or a periodate and the above-mentioned condensate, and a diazo resin organic salt which is a reaction product of the above-mentioned condensate and a sulfonic acid as described in U.S. Pat. No. 3,300,309.

Examples of the azide compound include an azide chalcone acid, diazide benzalmethylcyclohexanones, azide cinnamylideneacetophenones, an aromatic azide compound, and an aromatic diazide compound.

Examples of the halogenated organic compound include a halogen-containing oxadiazole compound, a halogen-containing triazine compound, a halogen-containing acetophenone compound, a halogen-containing benzophenone compound, a halogen-containing sulfoxide compound, a halogen-containing sulfone compound, a halogen-containing thiazole compound, a halogen-containing oxazole compound, a halogen-containing triazole compound, a halogen-containing 2-pyrone compound, a halogen-containing aliphatic hydrocarbon compound, a halogen-containing aromatic hydrocarbon compound, a halogen-containing heterocyclic compound, and a sulfenyl halide compound.

Other examples of the halogenated organic compound include: compounds used as halogen-based flame retardants such as tris(2,3-dibromopropyl) phosphate, tris(2,3-dibromo-3-chloropropyl) phosphate, chlorotetrabromomethane, hexachlorobenzene, hexabromobenzene, hexabromocyclododecane, hexabromobiphenyl, tribromophenyl allyl ether, tetrachlorobisphenol A, tetrabromobisphenol A, bis(bromoethyl ether) tetrabromobisphenol A, bis(chloroethyl ether) tetrachlorobisphenol A, tris(2,3-dibromopropyl) isocyanurate, 2,2-bis(4-hydroxy-3,5-dibromophenyl)propane, and 2,2-bis(4-hydroxyethoxy-3,5-dibromophenyl)propane; and compounds used as organic chloro-based agricultural chemicals such as dichlorophenyltrichloroethane.

Examples of the organic acid ester include a carboxylic acid ester and a sulfonic acid ester. In addition, examples of the organic acid amide include a carboxylic acid amide and a sulfonic acid amide. Further, examples of the organic acid imide include a carboxylic acid imide and a sulfonic acid imide.

The radiation sensitive substances may be used alone or in combination of two or more kinds thereof.

In the photoresist composition, the content of the radiation sensitive substance is preferably in a range of 10 parts by mass to 200 parts by mass, and more preferably in a range of 50 parts by mass to 150 parts by mass with respect to 100 parts by mass of the alkali-soluble resin.

Examples of a solvent for the photoresist composition include the following: ketones such as acetone, methyl ethyl ketone, cyclohexanone, cyclopentanone, cycloheptanone, 2-heptanone, methyl isobutyl ketone, and butyrolactone; alcohols such as methanol, ethanol, n-propyl alcohol, isopropyl alcohol, n-butyl alcohol, iso-butyl alcohol, tert-butyl alcohol, pentanol, heptanol, octanol, nonanol, and decanol; ethers such as ethylene glycol dimethyl ether, ethylene glycol diethyl ether, and dioxane; alcohol ethers such as ethylene glycol monomethyl ether, ethylene glycol monoethyl ether, ethylene glycol monopropyl ether, propylene glycol monomethyl ether, propylene glycol monoethyl ether, and propylene glycol monopropyl ether; esters such as ethyl formate, propyl formate, butyl formate, methyl acetate, ethyl acetate, butyl acetate, propyl acetate, methyl propionate, ethyl propionate, propyl propionate, butyl propionate, methyl butyrate, ethyl butyrate, butyl butyrate, propyl butyrate, ethyl lactate, and butyl lactate; monocarboxylic acid esters such as methyl 2-oxypropionate, ethyl 2-oxypropionate, propyl 2-oxypropionate, butyl 2-oxypropionate, methyl 2-methoxypropionate, ethyl 2-methoxypropionate, propyl 2-methoxypropionate, and butyl 2-methoxypropionate; cellosolve esters such as cellosolve acetate, methyl cellosolve acetate, ethyl cellosolve acetate, propyl cellosolve acetate, and butyl cellosolve acetate; propylene glycols such as propylene glycol, propylene glycol monomethyl ether, propylene glycol monomethyl ether acetate, propylene glycol monoethyl ether acetate, and propylene glycol monobutyl ether acetate; diethylene glycols such as diethylene glycol monomethyl ether, diethylene glycol monoethyl ether, diethylene glycol dimethyl ether, diethylene glycol diethyl ether, and diethylene glycol methylethyl ether; halogenated hydrocarbons such as trichloroethylene, chlorofluorocarbon solvents, HCFC, and HFC; completely fluorinated solvents such as perfluorooctane; aromatics such as toluene and xylene; and polar solvents such as dimethylacetamide, dimethylformamide, N-methylacetamide, and N-methylpyrrolidone.

These solvents may be used alone or in combination of two or more kinds thereof.

When the coating composition according to the invention is used as a color resist composition, the color resist composition contains an alkali-soluble resin, a polymerizable compound, and a colorant, in addition to the polymer according to the invention.

The alkali-soluble resin contained in a color resist can be the same as the alkali-soluble resin contained in the above-mentioned photoresist composition.

The polymerizable compound contained in the color resist composition is, for example, a compound having a photo-polymerizable functional group capable of polymerization or crosslinking reaction upon irradiation with an active energy ray such as an ultraviolet ray.

Examples of the polymerizable compound include: an unsaturated carboxylic acid such as (meth)acrylic acid; an ester of a monohydroxy compound and an unsaturated carboxylic acid; an ester of an aliphatic polyhydroxy compound and an unsaturated carboxylic acid; an ester of an aromatic polyhydroxy compound and an unsaturated carboxylic acid; an ester obtained by an esterification reaction of an unsaturated carboxylic acid, a polycarboxylic acid, and a polyhydroxy compound such as the aliphatic polyhydroxy compound and an aromatic polyhydroxy compound; a polymerizable compound having a urethane skeleton obtained by reacting a polyisocyanate compound and a (meth)acryloyl group-containing hydroxy compound; and a polymerizable compound having an acid group.

The polymerizable compound may be used alone or in combination of two or more kinds thereof.

Examples of the ester of the aliphatic polyhydroxy compound and the unsaturated carboxylic acid include (meth) acrylic acid esters such as ethylene glycol di(meth)acrylate, triethylene glycol di(meth)acrylate, trimethylolpropane tri (meth)acrylate, trimethylolethane tri(meth)acrylate, pentaerythritol di(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, and glycerol (meth) acrylate.

In addition, examples of the ester of the aliphatic polyhydroxy compound and the unsaturated carboxylic acid also include itaconic acid esters in which a (meth)acrylic acid moiety of these acrylates is replaced by itaconic acid, crotonic acid esters in which the (meth)acrylic acid moiety of these acrylates is replaced by crotonic acid, or maleic acid esters in which the (meth)acrylic acid moiety of these acrylates is replaced by maleic acid.

Examples of the ester of the aromatic polyhydroxy compound and the unsaturated carboxylic acid include hydroquinone di(meth)acrylate, resorcin di(meth)acrylate, and pyrogallol tri(meth)acrylate.

The ester obtained by the esterification reaction of the unsaturated carboxylic acid, the polycarboxylic acid, and the polyhydroxy compound may be a single material or a mixture. Examples of such an ester include: an ester obtained from (meth)acrylic acid, phthalic acid, and ethylene glycol; an ester obtained from (meth)acrylic acid, maleic acid, and diethylene glycol; an ester obtained from (meth) acrylic acid, terephthalic acid, and pentaerythritol; and an ester obtained from (meth)acrylic acid, adipic acid, butanediol, and glycerin.

Examples of the polymerizable compound having a urethane skeleton obtained by reacting the polyisocyanate compound and the (meth)acryloyl group-containing hydroxy compound include: an aliphatic diisocyanate such as hexamethylene diisocyanate and trimethylhexamethylene diisocyanate; an alicyclic diisocyanate such as cyclohexane diisocyanate and isophorone diisocyanate; and a reaction product of an aromatic diisocyanate such as tolylene diisocyanate and diphenylmethane diisocyanate with a hydroxy compound having a (meth)acryloyl group such as 2-hydroxyethyl (meth)acrylate and 3-hydroxy-[1,1,1-tri(meth) acryloyloxymethyl]propane.

The polymerizable compound having an acid group is, for example, an ester of an aliphatic polyhydroxy compound and an unsaturated carboxylic acid, and is preferably a polyfunctional polymerizable compound having an acid group obtained by reacting an unreacted hydroxy group of the aliphatic polyhydroxy compound with a non-aromatic carboxylic anhydride. The aliphatic polyhydroxy compound used in preparation of the polyfunctional polymerizable compound is preferably pentaerythritol or dipentaerythritol.

From the viewpoint of improving developability, curability, and the like, the acid value of the polyfunctional polymerizable compound is preferably in a range of 0.1 to 40, and more preferably in a range of 5 to 30. When two or more kinds of polyfunctional polymerizable compounds having an acid group are used in combination, and when a polyfunctional polymerizable compound having an acid group and a polyfunctional polymerizable compound having no acid group are used in combination, it is preferable that the acid value of a mixture of the polymerizable compounds is within the above-mentioned range.

Specific examples of the polymerizable compound having an acid group include a mixture containing dipentaerythritol hexaacrylate, dipentaerythritol pentaacrylate, and a succinic acid ester of dipentaerythritol pentaacrylate as main components, and the mixture is commercially available as ARONIX TO-1382 (manufactured by Toagosei Co., Ltd.).

Examples of other polymerizable compounds include: (meth)acrylamides such as ethylenebis(meth)acrylamide; allyl esters such as diallyl phthalate; and compounds having a vinyl group such as divinyl phthalate.

In the color resist composition, the content of the polymerizable compound is preferably in a range of 5% by mass to 80% by mass, more preferably in a range of 10% by mass to 70% by mass, and still more preferably in a range of 20% by mass to 50% by mass, with respect to the total solid content of the color resist composition.

The colorant in the color resist composition is not particularly limited as long as the colorant is able to color, and the colorant may be, for example, a pigment or a dye.

The pigment may be either an organic pigment or an inorganic pigment. As the organic pigment, pigments of respective hues such as a red pigment, a green pigment, a blue pigment, a yellow pigment, a violet pigment, an orange pigment, and a brown pigment can be used. In addition, examples of a chemical structure of the organic pigment include an azo-based structure, a phthalocyanine-based structure, a quinacridone-based structure, a benzimidazolone-based structure, an isoindolinone-based structure, a dioxazine-based structure, an indanthrene-based structure, and a perylene-based structure. In addition, examples of the inorganic pigment include barium sulfate, lead sulfate, titanium oxide, yellow lead, colcothar, and chromium oxide.

Note that the following "C.I." means Color Index.

Examples of the red pigment include C.I. Pigment Red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, and 276. Among these, C.I. Pigment Red 48:1, 122, 168, 177, 202, 206, 207, 209, 224, 242, or 254 is preferable, and C.I. Pigment Red 177, 209, 224, or 254 is more preferable.

Examples of the green pigment include C.I. Pigment Green 1, 2, 4, 7, 8, 10, 13, 14, 15, 17, 18, 19, 26, 36, 45, 48, 50, 51, 54, 55, and 58. Among these, C.I. Pigment Green 7, 36, or 58 is preferable.

Examples of the blue pigment include C.I. Pigment Blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, and 79. Among these, C.I. Pigment Blue 15, 15:1, 15:2, 15:3, 15:4, or 15:6 is preferable, and C.I. Pigment Blue 15:6 is more preferable.

Examples of the yellow pigment include C.I. Pigment Yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 117, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, and 208. Among these, C.I. Pigment Yellow 83, 117, 129, 138, 139, 150, 154, 155, 180, or 185 is preferable, and C.I. Pigment Yellow 83, 138, 139, 150, or 180 is more preferable.

Examples of the violet pigment include C.I. Pigment Violet 1, 1:1, 2, 2:2, 3, 3:1, 3:3, 5, 5:1, 14, 15, 16, 19, 23, 25, 27, 29, 31, 32, 37, 39, 42, 44, 47, 49, and 50. Among these, C.I. Pigment Violet 19 or 23 is preferable, and C.I. Pigment Violet 23 is more preferable.

Examples of the orange pigment include C.I. Pigment Orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, and 79. Among these, C.I. Pigment Orange 38 or 71 is preferable.

Since respective pixels of three primary colors of a color filter used in a liquid crystal display device and an organic EL display device are red (R), green (G), and blue (B), the red pigment, the green pigment, and the blue pigment are used as main components, and the organic pigment of a color such as yellow, violet, or orange may be used for hue adjustment for the purpose of improving color reproducibility.

The average particle diameter of the organic pigment is preferably 1 μm or less, more preferably 0.5 μm or less, and still more preferably 0.3 μm or less, in order to increase the luminance of the color liquid crystal display device and the organic EL display device. The organic pigment is preferably used after being subjected to a dispersion treatment to obtain these average particle diameters.

The average primary particle diameter of the organic pigment is preferably 100 nm or less, more preferably 50 nm or less, still more preferably 40 nm or less, and particularly preferably in a range of 10 nm to 30 nm.

Note that the average particle diameter of the organic pigment is measured by a dynamic light scattering particle size analyzer, and can be measured by, for example, Nanotrac particle size distribution measuring devices "UPA-EX150" and "UPA-EX250" manufactured by Nikkiso Co., Ltd.

When the color resist composition is used to form the black matrix (BM), the colorant is not particularly limited as long as the colorant is black, and examples of the colorant include carbon black, lamp black, acetylene black, bone black, thermal black, channel black, furnace black, graphite, iron black, and titanium black. Among these, carbon black and titanium black are preferable from the viewpoints of light shielding ratio and image characteristics.

In addition, the colorant may also be a combination in which two or more kinds of organic pigments are mixed and of which the color is made black by color mixing.

Examples of a commercially available product of the carbon black include: MA7, MA8, MA11, MA100, MA100R, MA220, MA230, MA600, #5, #10, #20, #25, #30, #32, #33, #40, #44, #45, #47, #50, #52, #55, #650, #750, #850, #950, #960, #970, #980, #990, #1000, #2200, #2300, #2350, #2400, #2600, #3050, #3150, #3250, #3600, #3750, #3950, #4000, #4010, OIL7B, OIL9B, OIL11B, OIL30B, and OIL31B manufactured by Mitsubishi Chemical Corporation; Printex 3, Printex 30P, Printex 30, Printex 300P, Printex 40, Printex 45, Printex 55, Printex 60, Printex 75, Printex 80, Printex 85, Printex 90, Printex A, Printex L, Printex G, Printex P, Printex U, Printex V, Printex G, Special Black 550, Special Black 350, Special Black 250, Special Black 100, Special Black 6, Special Black 5, Special Black 4, Color Black FW1, Color Black FW2, Color Black FW2V, Color Black FW18, Color Black FW18, Color Black FW200, Color Black S160, and Color Black S170 manufactured by Evonik Degussa Japan Co., Ltd; Monarch 120, Monarch 280, Monarch 460, Monarch 800, Monarch 880, Monarch 900, Monarch 1000, Monarch 1100, Monarch 1300, Monarch 1400, Monarch 4630, REGAL 99, REGAL 99R, REGAL 415, REGAL 415R, REGAL 250, REGAL 250R, REGAL 330, REGAL 400R, REGAL 55R0, REGAL 660R, BLACK PEARLS 480, PEARLS 130, and VULCAN XC72R, and ELFTEX-8 manufactured by Cabot Japan K.K.; and RAVEN 11, RAVEN 14, RAVEN 15, RAVEN 16, RAVEN 22, RAVEN 30, RAVEN 35, RAVEN 40, RAVEN 410, RAVEN 420, RAVEN 450, RAVEN 500, RAVEN 780, RAVEN 850, RAVEN 890H, RAVEN 1000, RAVEN 1020, RAVEN 1040, RAVEN 1060U, RAVEN 1080U, RAVEN 1170, RAVEN 1190U, RAVEN 1250, RAVEN 1500, RAVEN 2000, RAVEN 2500U, RAVEN 3500, RAVEN 5000, RAVEN 5250, RAVEN 5750, and RAVEN 7000 produced by Columbian Chemicals.

Among the above-mentioned carbon black, carbon black coated with a resin is preferable as carbon black having a high optical density and a high surface resistivity required for the black matrix of the color filter.

Examples of a commercially available product of the titanium black include Titanium Black 10S, 12S, 13R, 13M, and 13M-C manufactured by Mitsubishi Materials Corporation.

Examples of the colorant used in formation of the black matrix (BM) include: a colorant in which two or more kinds of organic pigments are mixed and of which the color is made black by color mixing; and a black pigment in which pigments of three colors of red, green, and blue are mixed.

Examples of color materials that can be mixed and used for preparing the black pigment include Victoria Pure Blue (C.I. 42595), Auramine O (C.I. 41000), Cathilon Brilliant Flavin (Basic 13), Rhodamine 6GCP (C.I. 45160), Rhodamine B (C.I. 45170), Safranin OK 70:100 (C.I. 50240), Erioglaucine X (C.I. 42080), No. 120/Lionol Yellow (C.I. 21090), Lionol Yellow GRO (C.I. 21090), Symuler Fast Yellow 8GF (C.I. 21105), Benzidine Yellow 4T-564D (C.I. 21095), Symuler Fast Red 4015 (C.I. 12355), Lionol Red 7B4401 (C.I. 15850), Fastogen Blue TGR-L (C.I. 74160), Lionol Blue SM (C.I. 26150), Lionol Blue ES (C.I. Pigment Blue 15:6), Lionogen Red GD (C.I. Pigment Red 168), and Lionol Green 2YS (C.I. Pigment Green 36).

Examples of other color materials that can be mixed and used for preparing the black pigment include C.I. Yellow Pigment 20, 24, 86, 93, 109, 110, 117, 125, 137, 138, 147, 148, 153, 154, 166, C.I. Orange Pigment 36, 43, 51, 55, 59, 61, C.I. Red Pigment 9, 97, 122, 123, 149, 168, 177, 180, 192, 215, 216, 217, 220, 223, 224, 226, 227, 228, 240, C.I. Violet Pigment 19, 23, 29, 30, 37, 40, 50, C.I. Blue Pigment 15, 15:1, 15:4, 22, 60, 64, C.I. Green Pigment 7, and C.I. Brown Pigment 23, 25, 26.

When carbon black is used as the black pigment, the average primary particle diameter of the carbon black is preferably in a range of 0.01 μm to 0.08 μm, and more preferably, from the viewpoint of good developability, in a range of 0.02 μm to 0.05 μm.

The carbon black has a particle shape different from that of the organic pigment and the like, is present in a state called a structure in which primary particles are fused to each other, and may form fine pores in particle surfaces by a post-treatment. Therefore, in order to express the particle shape of the carbon black, in addition to the average particle diameter of the primary particles obtained by the same method as that of the organic pigment, it is generally preferable to measure the DBP absorption amount (JIS K6221) and the specific surface area (JIS K6217) that is obtained by a BET method, and use the measured DBP absorption amount and specific surface area as indexes of the structure and the pore amount.

The dibutyl phthalate (hereinafter abbreviated as "DBP") absorption amount of the carbon black is preferably in a range of 40 $cm^3$/100 g to 100 $cm^3$/100 g, and more preferably, from the viewpoint of obtaining good dispersibility and developability, in a range of 50 $cm^3$/100 g to 80 $cm^3$/100 g. The specific surface area of the carbon black obtained by the BET method is preferably in a range of 50 $m^2$/g to 120 $m^2$/g, and more preferably, from the viewpoint of good dispersion stability, in a range of 60 $m^2$/g to 95 $m^2$/g.

Examples of the dye as the colorant in the color resist composition include an azo-based dye, an anthraquinone-based dye, a phthalocyanine-based dye, a quinoneimine-based dye, a quinoline-based dye, a nitro-based dye, a carbonyl-based dye, and a methine-based dye.

Examples of the azo-based dye include C.I. Acid Yellow 11, C.I. Acid Orange 7, C.I. Acid Red 37, C.I. Acid Red 180, C.I. Acid Blue 29, C.I. Direct Red 28, C.I. Direct Red 83, C.I. Direct Yellow 12, C.I. Direct Orange 26, C.I. Direct Green 28, C.I. Direct Green 59, C.I. Reactive Yellow 2, C.I. Reactive Red 17, C.I. Reactive Red 120, C.I. Reactive black 5, C.I. Disperse Orange 5, C.I. Disperse Red 58, C.I. Disperse Blue 165, C.I. Basic Blue 41, C.I. Basic Red 18, C.I. Mordant Red 7, C.I. Mordant Yellow 5, and C.I. Mordant Black 7.

Examples of the anthraquinone-based dye include C.I. Vat Blue 4, C.I. Acid Blue 40, C.I. Acid Green 25, C.I. Reactive Blue 19, C.I. Reactive Blue 49, C.I. Disperse Red 60, C.I. Disperse Blue 56, and C.I. Disperse Blue 60.

Examples of the phthalocyanine-based dye include C.I. Pat Blue 5, examples of the quinoneimine-based dye include C.I. Basic Blue 3 and C.I. Basic Blue 9, examples of the quinoline-based dye include C.I. Solvent Yellow 33, C.I. Acid Yellow 3, and C.I. Disperse Yellow 64, and examples of the nitro-based dye include C.I. Acid Yellow 1, C.I. Acid Orange 3, and C.I. Disperse Yellow 42.

As the colorant in the color resist composition, it is preferable to use a pigment from the viewpoint of obtaining excellent light resistance, weather resistance, and fastness of the obtained coating film, but in order to adjust the hue, a dye may be used in combination with the pigment as necessary.

In the color resist composition, the content of the colorant is preferably 1% by mass or more, more preferably in a range of 5% by mass to 80% by mass, and still more preferably in a range of 5% by mass to 70% by mass, with respect to the total solid content of the color resist composition.

When the color resist composition is used to form the respective pixels of red (R), green (G), and blue (B) of the color filter, the content of the colorant in the color resist composition is preferably in a range of 5% by mass to 60% by mass, and more preferably in a range of 10% by mass to 50% by mass, with respect to the total solid content of the color resist composition.

When the color resist composition is used to form the black matrix of the color filter, the content of the colorant in the color resist composition is preferably in a range of 20% by mass to 80% by mass, and more preferably in a range of 30% by mass to 70% by mass, with respect to the total solid content of the color resist composition.

In the color resist composition, when the colorant is a pigment, it is preferable to use the colorant as a pigment dispersion prepared by dispersing the pigment in an organic solvent using a dispersant.

Examples of the dispersant include: a surfactant; an intermediate or a derivative of a pigment; an intermediate or a derivative of a dye; and a resin dispersant such as a polyamide-based resin, a polyurethane-based resin, a polyester-based resin, and an acrylic resin. Among these, a graft copolymer having a nitrogen atom, an acrylic block copolymer having a nitrogen atom, and a urethane resin dispersant are preferable. Since these dispersants have a nitrogen atom, the dispersion stability is improved for that the nitrogen atom has affinity for the pigment surface and a portion other than the nitrogen atom increases the affinity for a medium.

These dispersants may be used alone or in combination of two or more kinds thereof.

Examples of a commercially available product of the dispersant include: "Efka" series ("Efka 46" and the like) manufactured by BASF; "Disperbyk" series and "BYK" series ("BYK-160", "BYK-161", "BYK-2001", and the like) manufactured by BYK Japan; "Solsperse" series manufactured by Lubrizol Japan Co., Ltd.; "KP" series manufactured by Shin-Etsu Chemical Co., Ltd.; "Polyflow" series manufactured by Kyoeisha Chemical Co., Ltd.; "DISPARLON" series manufactured by Kusumoto Chemicals, Ltd.; and "AJISPER" series ("AJISPER PB-814" and the like) manufactured by Ajinomoto Fine-Techno Co., Inc.

Examples of the organic solvent used in preparation of the pigment dispersion include: acetic acid ester solvents such as propylene glycol monomethyl ether acetate and propylene glycol monoethyl ether acetate; propionate solvents such as ethoxypropionate; aromatic solvents such as toluene, xylene, and methoxybenzene; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethylformamide, γ-butyrolactone, and N-methyl-2-pyrrolidone; lactone solvents such as γ-butyrolactone; and carbamic acid esters.

These solvents may be used alone or in combination of two or more kinds thereof.

Examples of a method for preparing the pigment dispersion include a method including a kneading dispersion step and a fine dispersion step of the colorant, and a method including only a fine dispersion step. In the kneading dispersion step, the colorant, a part of the alkali-soluble resin, and optionally the dispersant are mixed and kneaded. The colorant can be dispersed by being dispersed while applying a strong shearing force using a kneader.

Examples of a machine used for kneading include a two-roll mill, a three-roll mill, a ball mill, a tron mill, a disperser, a kneader, a co-kneader, a homogenizer, a blender, and a single-screw extruder or a twin-screw extruder.

It is preferable that the colorant has a fine particle size by a salt milling method or the like before the above-mentioned kneading.

In the fine dispersion step, particles of the colorant can be dispersed to a fine state close to primary particles by mixing and dispersing a product obtained by adding a solvent to a composition containing the colorant obtained in the kneading dispersion step, or a product obtained by mixing a colorant, an alkali-soluble resin, a solvent, and optionally the dispersant using a disperser together with a dispersion medium of fine particles of glass, zirconia, and ceramic.

From the viewpoint of improving transmittance, contrast, and the like of the color filter, the average particle diameter of the primary particles of the colorant is preferably 10 nm to 100 nm, and more preferably 10 nm to 60 nm. Note that the average particle diameter of the colorant is measured by a dynamic light scattering particle size analyzer, and can be measured by, for example, Nanotrac particle size distribution measuring devices "UPA-EX150" and "UPA-EX250" manufactured by Nikkiso Co., Ltd.

As described above, examples of the coating composition include, but are not limited to, the paint composition, the photoresist composition, and the color resist composition.

Specific examples of the application of the coating composition according to the invention include: an antiglare (AG) hard coating material, an antireflection (LR) coating material, a low refractive index layer coating material, a high refractive index layer coating material, a clear hard coating material, and a polymerizable liquid crystal coating material, which are coating materials for various display screens such as a liquid crystal display (hereinafter, abbreviated as "LCD"), a plasma display (hereinafter, abbreviated as "PDP"), an organic EL display (hereinafter, abbreviated as "OLED"), and a quantum dot display (hereinafter, abbreviated as "QDD"); a color resist, an inkjet ink, a printing ink, or a paint for forming respective pixels such as RGB of a color filter (hereinafter abbreviated as "CF") of an LCD and the like; a black resist, an inkjet ink, a printing ink, or a paint for forming a black matrix, a black column spacer, and a black photo spacer of a CF of an LCD and the like; a paint for a transparent protective film for protecting a CF surface used for a CF of an LCD and the like; a resin composition for a liquid crystal material, a column spacer, and a photo spacer of an LCD; a resin composition for pixel partition walls of an LCD, a PDP, an OLED, and a QDD, a positive photoresist for forming an electrode, a protective film, an insulating film, a plastic housing, a paint for the plastic housing, and a bezel (frame) ink; a prism sheet and a light diffusion film which are backlight members of an LCD; a paint for an organic insulating film of a liquid crystal TFT array of an LCD; a surface protective coating material for an internal polarizing plate of an LCD; a phosphor of a PDP; an organic EL material and a sealing material (a protective film or a gas barrier) of an OLED; a quantum dot ink, a sealing material, and a protective film of a QDD; a high refractive index lens, a low refractive index sealing, and an LED pixel of a micro (mini) LED display; a positive photoresist, a chemically amplified photoresist, an antireflection film, a multilayer material (SOC, SOG), an underlayer film, a buffer coat, a chemical agent such as a developing solution, a rinse liquid, a pattern collapse inhibitor, a polymer residue remover, and a cleaning agent, and a nanoimprint release agent, which are used in semiconductor production; a resin composition (a resin composition such as an epoxy resin, a phenol resin, a polyphenylene ether resin, a liquid crystal polymer, a polyimide resin, a bismaleimide resin, a bisallyl nadiimide resin, and a benzoxazine resin), a copper-clad laminate, a resin-coated copper foil, a build-up film, a passivation film, an interlayer insulating film, a flexible copper-clad laminate, and a dry film resist, which are used for a semiconductor post-treatment or a printed wiring board; a color resist for an image sensor; a liquid-repellent agent for a solder flux; a dispersant, a paint, and a green sheet for a laminated ceramic capacitor; a positive electrode material, a negative electrode material, a separator, and an electrolytic solution for a lithium ion battery; an exterior paint, rubber, elastomer, glass, a vapor deposition material anchor coat, a headlamp lens, a solid lubricating paint, a heat dissipating substrate, an interior paint, and a refinish paint for automobiles; a wallpaper, a flooring material, a kitchen member, and a bathroom/toilet member for residential facilities; an inkjet ink for a printed material, an ink for offset printing, an ink for gravure printing, an ink for screen printing, a photoresist for a printing plate manufacturing process, a photosensitive material for a lithographic printing plate (a PS plate), a package adhesive, and a ballpoint pen ink; a primer for easy adhesion of a plastic film and the like; a water-repellent agent for fibers; a non-diffusing agent for grease; a cleaning liquid for cleaning surfaces of various products or components; a hard coating material for optical recording media such as a CD, a DVD, and a blu-ray disc; a paint or a hard coating material for a housing or a screen of a smartphone or a mobile phone; a hard coating material for a transfer film for an insert mold (IMD or IMF); a release film; a paint or a coating material for various plastic molded articles such as a housing of a household appliance; a printing ink or a paint for various building materials such as a decorative plate; a coating material for window glass of a house; a paint for woodworking of furniture and the like; a coating material for an artificial leather or a synthetic leather; a coating material for a rubber roller for OA equipment such as a copying machine and a printer; a coating material for glass of a reading unit of OA equipment such as a copying machine and a scanner; an optical lens of a camera, a video camera, glasses, a contact lens, and the like, and a coating material thereof, a windshield for a watch such as a wristwatch, and a coating material for glass; a coating material for a window of various vehicles such as automobiles and railway vehicles; a paint for an antireflection film for a solar cell cover glass or film; a paint or a coating material for a FRP bathtub; a PCM for a metal building material or a home electric appliance; and a single-layer coating composition or a multilayer coating composition for a photofabrication process and the like.

Since the polymer according to the invention has an excellent surface tension reducing ability, not only the leveling property but also the functions of wettability, permeability, cleaning property, water repellency, oil repellency, antifouling property, lubricity, blocking prevention property, and releasability can be expected. In addition, when the polymer according to the invention is blended in a paint or a coating agent containing fine particles, the dispersibility of the fine particles is improved, and not only the leveling property but also a function as a dispersant of the fine particles can be expected. In addition, by adding the polymer according to the invention to a pressure-sensitive adhesive composition used for a pressure-sensitive adhesive tape or the like in addition to the above-mentioned coating composition, not only the leveling property but also the functions of reducing peeling force, preventing variation in peeling force, and preventing peeling electrification can be expected.

EXAMPLES

Hereinafter, the invention will be described in detail with reference to Examples and Comparative Examples.

Example 1

Preparation of Block Copolymer

A flask substituted by nitrogen was charged with 15.0 g of 3-methacryloyloxypropyltris(trimethylsiloxy)silane and 79.0 g of methyl ethyl ketone as a solvent, and the temperature was raised to 50° C. while stirring under a nitrogen stream. Next, 4.2 g of 2,2'-bipyridyl and 1.5 g of cuprous chloride were charged and stirred for 30 minutes while maintaining the temperature in the flask at 50° C. Thereafter, 2.7 g of ethyl 2-bromoisobutyrate was added thereto, and the mixture was reacted at 50° C. for 3 hours under a nitrogen stream to obtain a polymer block of 3-methacryloyloxypropyltris(trimethylsiloxy)silane.

Next, 35.0 g of polypropylene glycol monomethacrylate (the average repetition number of propylene glycol: 4 to 6) was added to the reaction system containing the polymer block of 3-methacryloyloxypropyltris(trimethylsiloxy)silane, and the mixture was reacted at 50° C. for 18 hours to obtain a reaction product. Next, 30 g of activated alumina was added to the obtained reaction product, and the mixture was stirred. The activated alumina was filtered, and then the solvent was distilled off under a reduced pressure to obtain a block copolymer (1).

The molecular weight of the obtained block copolymer (1) was measured by GPC, and as a result, it was found that the weight average molecular weight (Mw) was 10,300, the number average molecular weight (Mn) was 9,200, and (Mw/Mn) was 1.1. In addition, according to the raw material charging ratio, the content of the functional group represented by —Si[OSi$(CH_3)_3$]$_3$ in the block copolymer (1) was 22% by mass.

Formation and Evaluation of Coating Film

A coating composition was prepared by mixing 3.0 g of a resin solution (ACRYDIC ZL-295, manufactured by DIC Corporation) containing 40% by mass of an alkali-soluble resin, 1.2 g of ARONIX M-402 (manufactured by Toagosei Co., Ltd., a mixture of dipentaerythritol pentaacrylate and dipentaerythritol hexaacrylate), 0.001 g of the block copolymer (1) in terms of solid content, and 3.8 g of propylene glycol monomethyl ether acetate (PGMEA).

3 ml of the obtained coating composition was added dropwise to a central portion of a 10 cm×10 cm chrome-plated glass substrate, and spin coating was performed under conditions of a rotation speed of 1,000 rpm and a rotation time of 10 seconds, followed by heating and drying at 100° C. for 100 seconds to prepare a laminate having a coating layer. The coating layer of the obtained laminate was visually observed, and the smoothness of the coating layer was evaluated according to the following criteria. Results are shown in Table 1.

A: unevenness of the coating film is hardly observed.

B: unevenness of a part of the coating film is observed.

C: unevenness of the entire coating film is observed.

With respect to the coating layer of the obtained laminate, the film thickness of the coating layer was measured at a total of 400 points using a reflection spectroscopic film thickness meter (FE-3000, manufactured by Otsuka Electronics Co., Ltd.), and a film thickness standard deviation was calculated. The smaller the film thickness standard deviation is, the less the unevenness of the coating film is, and it can be evaluated that the coating layer is smooth.

Example 2

A flask substituted by nitrogen was charged with 33.5 g of 3-methacryloyloxypropyltris(trimethylsiloxy)silane and 75.0 g of methyl ethyl ketone as a solvent, and the temperature was raised to 50° C. while stirring under a nitrogen stream. Next, 4.2 g of 2,2'-bipyridyl and 1.5 g of cuprous chloride were charged and stirred for 30 minutes while maintaining the temperature in the flask at 50° C. Thereafter, 2.7 g of ethyl 2-bromoisobutyrate was added thereto, and the mixture was reacted at 50° C. for 4 hours under a nitrogen stream to obtain a polymer block of 3-methacryloyloxypropyltris(trimethylsiloxy)silane.

Next, 16.5 g of polypropylene glycol monomethacrylate (the average repetition number of propylene glycol: 4 to 6) was added to a reaction system containing the polymer block of 3-methacryloyloxypropyltris(trimethylsiloxy)silane, and the mixture was reacted at 50° C. for 20 hours to obtain a reaction product. Next, 30 g of activated alumina was added to the obtained reaction product, and the mixture was stirred. The activated alumina was filtered, and then the solvent was distilled off under a reduced pressure to obtain a block copolymer (2).

The molecular weight of the obtained block copolymer (2) was measured by GPC, and as a result, it was found that the weight average molecular weight (Mw) was 7,100, the number average molecular weight (Mn) was 6,100, and (Mw/Mn) was 1.2. The content of the functional group represented by —Si[OSi$(CH_3)_3$]$_3$ in the obtained block copolymer (2) was 49% by mass.

A coating composition was prepared and a coating film was formed and evaluated in the same manner as in Example 1 except that the block copolymer (2) was used instead of the block copolymer (1). Results are shown in Table 1.

Example 3

A flask substituted by nitrogen was charged with 33.5 g of 3-methacryloyloxypropyltris(trimethylsiloxy)silane and 75.0 g of methyl ethyl ketone as a solvent, and the temperature was raised to 60° C. while stirring under a nitrogen stream. Next, 4.2 g of 2,2'-bipyridyl and 1.5 g of cuprous chloride were charged and stirred for 30 minutes while maintaining the temperature in the flask at 60° C. Thereafter, 2.7 g of ethyl 2-bromoisobutyrate was added thereto, and the mixture was reacted at 60° C. for 8 hours under a nitrogen stream to obtain a polymer block of 3-methacryloyloxypropyltris(trimethylsiloxy)silane.

Next, 16.5 g of poly 1,2-butylene glycol monomethacrylate (the average repetition number of 1,2-butylene glycol: 6) was added to the reaction system containing the polymer block of 3-methacryloyloxypropyltris(trimethylsiloxy)silane, and the mixture was reacted at 60° C. for 20 hours to obtain a reaction product. Next, 30 g of activated alumina was added to the obtained reaction product, and the mixture was stirred. The activated alumina was filtered, and then the solvent was distilled off under a reduced pressure to obtain a block copolymer (3).

The molecular weight of the obtained block copolymer (3) was measured by GPC, and as a result, it was found that the weight average molecular weight (Mw) was 10,300, the number average molecular weight (Mn) was 7,900, and (Mw/Mn) was 1.3. The content of the functional group represented by —Si[OSi$(CH_3)_3$]$_3$ in the obtained block copolymer (3) was 49% by mass.

A coating composition was prepared and a coating film was formed and evaluated in the same manner as in Example 1 except that the block copolymer (3) was used instead of the block copolymer (1). Results are shown in Table 1.

Comparative Example 1

A flask substituted by nitrogen was charged with 15.0 g of 3-methacryloyloxypropyltris(trimethylsiloxy)silane, 35.0 g of polypropylene glycol monomethacrylate (the average repetition number of propylene glycol: 4 to 6), and 79.0 g of methyl ethyl ketone as a solvent, and the temperature was raised to 50° C. while stirring under a nitrogen stream. Next, 4.2 g of 2,2'-bipyridyl and 1.5 g of cuprous chloride were charged and stirred for 30 minutes while maintaining the temperature in the flask at 50° C. Thereafter, 2.6 g of ethyl 2-bromoisobutyrate was added thereto, and the mixture was reacted at 50° C. for 8 hours under a nitrogen stream to obtain a reaction product. Next, 30 g of activated alumina was added to the obtained reaction product, and the mixture was stirred. The activated alumina was filtered, and then the solvent was distilled off under a reduced pressure to obtain a random copolymer (1').

The molecular weight of the obtained random copolymer (1') was measured by GPC, and as a result, it was found that the weight average molecular weight (Mw) was 5,100, the number average molecular weight (Mn) was 5,900, and (Mw/Mn) was 1.2. In addition, the content of the functional group represented by —Si[OSi$(CH_3)_3$]$_3$ in the obtained random copolymer (1') was 22% by mass.

A coating composition was prepared and a coating film was formed and evaluated in the same manner as in Example 1 except that the random copolymer (1') was used instead of the block copolymer (1). Results are shown in Table 1.

Comparative Example 2

A flask substituted by nitrogen was charged with 137.8 g of butyl acetate as a solvent, and the temperature was raised to 100° C. while stirring under a nitrogen stream. Next, a monomer polymerization initiator solution in which 31.0 g of 3-methacryloyloxypropyltris(trimethylsiloxy)silane, 72.3 g of polypropylene glycol monomethacrylate (the average repetition number of propylene glycol: 4 to 6), and 7.8 g of t-butyl peroxy-2-ethylhexanoate as a polymerization initiator were dissolved in 103.3 g of butyl acetate was set in a dropping device, and was added dropwise over 2 hours while maintaining the temperature in the flask at 100° C. After completion of the dropwise addition, the mixture was reacted at 100° C. for 5 hours under a nitrogen stream to obtain a random copolymer (2').

The molecular weight of the obtained random copolymer (2') was measured by GPC, and as a result, it was found that the weight average molecular weight (Mw) was 4,400, the number average molecular weight (Mn) was 1,700, and (Mw/Mn) was 2.7. In addition, the content of the functional group represented by —Si[OSi$(CH_3)_3$]$_3$ in the obtained random copolymer (2') was 22% by mass.

A coating composition was prepared and a coating film was formed and evaluated in the same manner as in Example 1 except that the random copolymer (2') was used instead of the block copolymer (1). Results are shown in Table 1.

Comparative Example 3

A flask substituted by nitrogen was charged with 137.3 g of butyl acetate as a solvent, and the temperature was raised to 100° C. while stirring under a nitrogen stream. Next, a monomer polymerization initiator solution in which 67.0 g of 3-methacryloyloxypropyltris(trimethylsiloxy)silane, 33.0 g of polypropylene glycol monomethacrylate (the average repetition number of propylene glycol: 4 to 6), and 6.0 g of t-butyl peroxy-2-ethylhexanoate as a polymerization initiator were dissolved in 100.0 g of butyl acetate was set in a dropping device, and was added dropwise over 3 hours while maintaining the temperature in the flask at 100° C. After completion of the dropwise addition, the mixture was reacted at 100° C. for 5 hours under a nitrogen stream to obtain a random copolymer (3').

The content of the functional group represented by —Si[OSi$(CH_3)_3$]$_3$ in the obtained random copolymer (3') was 49% by mass.

The molecular weight of the obtained random copolymer (3') was measured by GPC, and as a result, it was found that the weight average molecular weight (Mw) was 6,100, the number average molecular weight (Mn) was 2,600, and (Mw/Mn) was 2.3. In addition, the content of the functional group represented by —Si[OSi$(CH_3)_3$]$_3$ in the obtained random copolymer (3') was 49% by mass.

A coating composition was prepared and a coating film was formed and evaluated in the same manner as in Example 1 except that the random copolymer (3') was used instead of the block copolymer (1). Results are shown in Table 1.

TABLE 1

| | Example 1 | Example 2 | Example 3 | Comparative Example 1 | Comparative Example 2 | Comparative Example 3 |
|---|---|---|---|---|---|---|
| Leveling agent | Block copolymer (1) | Block copolymer (2) | Block copolymer (3) | Random copolymer (1') | Random copolymer (2') | Random copolymer (3') |
| Smoothness of coating film | A | A | A | C | C | C |

The developability of the coating layer of respective laminates prepared in Examples 1 and 2 was also evaluated. Specifically, the prepared laminate was immersed in a 5% aqueous solution of an inorganic alkaline resist developing solution (semi-clean DL-A10, manufactured by YOKOHAMA OILS & FATS INDUSTRY CO., LTD.) for 120 seconds, then rinsed with pure water for 120 seconds, and dried. No coating layer was left on the laminates of Examples 1 and 2 after immersion in the developing solution, and it was found that the polymer according to the invention can be used as a leveling agent suitable for a resist composition.

The invention claimed is:

1. A polymer comprising:

a polymer block (A1) of a polymerizable monomer (a1) having a functional group represented by $-Si[OSi(R)_3]_n[R']_{3-n}$ (n is an integer of 1 to 3, each R independently represents an alkyl group having 1 to 3 carbon atoms, and each R'independently represents an alkyl group having 1 to 3 carbon atoms); and a polymer block (A2), which is a polymer block of a polymerizable monomer (a2-2) having a group containing a polyoxyalkylene chain, or a polymer block of the polymerizable monomer (a2-2) having a group containing a polyoxyalkylene chain and one or more selected from a polymerizable monomer (a2-1) having an alkyl group having 1 to 18 carbon atoms and a polymerizable monomer (a2-3) having an aromatic group having 6 to 18 carbon atoms, wherein the polymerizable monomer (a2-2) is a compound represented by the following formula (a2-2):

(a2-2)

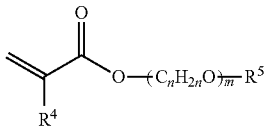

wherein, in the formula (a2-2), $R^4$ represents a hydrogen atom or a methyl group, $R^5$ represents a hydrogen atom or an alkyl group having 1 to 18 carbon atoms, n is an integer of 3 to 4, and m is an integer of 1 to 100.

2. The polymer according to claim 1, wherein the polymerizable monomer (a1) is a compound represented by the following formula (a1-1):

(a1-1)

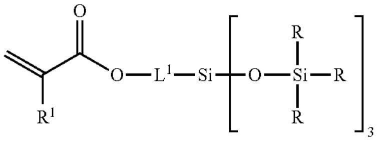

wherein, in the formula (a1-1), each R independently represents an alkyl group having 1 to 3 carbon atoms, $R^1$ represents a hydrogen atom or a methyl group, and $L^1$ represents a divalent organic group or a single bond.

3. The polymer according to claim 1, wherein the functional group represented by $-Si[OSi(R)_3]_n[R']_{3-n}$ is $-Si[OSi(CH_3)_3]_3$.

4. The polymer according to claim 1, wherein the polymerizable monomer (a2-1) is a compound represented by the following formula (a2-1):

(a2-1)

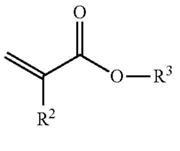

wherein, in the formulae (a2-1), $R^2$ represents a hydrogen atom or a methyl group, $R^3$ represents an alkyl group having 1 to 18 carbon atoms.

5. The polymer according to claim 1, which is free of a fluorine atom.

6. The polymer according to claim 1, wherein a content ratio of the polymer block (A1) is 5% by mass or more and 95% by mass or less with respect to a total amount of the polymer.

7. The polymer according to claim 1, which has a number average molecular weight in a range of 1,000 to 500,000.

8. A coating composition comprising:

a leveling agent, wherein the leveling agent is a polymer containing a polymer block (A1) of a polymerizable monomer (a1) having a functional group represented by $-Si[OSi(R)_3]_n[R']_{3-n}$ (n is an integer of 2 to 3, each R independently represents an alkyl group having 1 to 3 carbon atoms, and each R' independently represents an alkyl group having 1 to 3 carbon atoms), and the polymer is contained in an amount of 0.0001 parts by mass to 10 parts by mass with respect to 100 parts by mass of a solid content of the coating composition.

9. A resist composition comprising a polymer comprising:

a polymer block (A1) of a polymerizable monomer (a1) having a functional group represented by $-Si[OSi(R)_3]_n[R']_{3-n}$ (n is an integer of 2 to 3, each R independently represents an alkyl group having 1 to 3 carbon atoms, and each R' ndependently represents an alkyl group having 1 to 3 carbon atoms);

a polymer block (A2), which is a polymer block of a polymerizable monomer (a2-2) represented by the following formula (a2-2):

(a2-2)

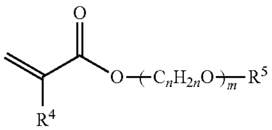

wherein, in the formula (a2-2), $R^4$ represents a hydrogen atom or a methyl group, $R^5$ represents a hydrogen atom or an alkyl group having 1 to 18 carbon atoms, n is an integer of 1 to 4, and m is an integer of 1 to 100; and an alkali-soluble resin.

10. An article comprising:

the polymer according to claim 1.

11. A method for producing a block copolymer in which a compound represented by the following formula (a1-1), and a compound represented by the following formula (a2-2) or the compound represented by the following formula (a2-2) and a compound represented by the following formula (a2-1) are used as reaction raw materials for living polymerization:

(a1-1)

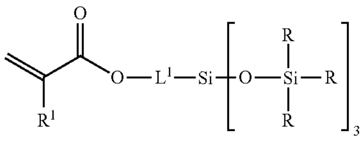

-continued (a2-1)

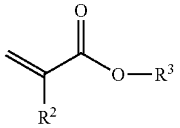

(a2-2)

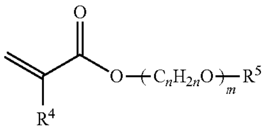

wherein, in the formulae (a1-1), (a2-1), and (a2-2), each R independently represents an alkyl group having 1 to 3 carbon atoms, $R^1$ represents a hydrogen atom or a methyl group, $L^1$ represents a divalent organic group or a single bond, $R^2$ represents a hydrogen atom or a methyl group, $R^3$ represents an alkyl group having 1 to 18 carbon atoms, $R^4$ represents a hydrogen atom or a methyl group, $R^5$ represents a hydrogen atom or an alkyl group having 1 to 18 carbon atoms, n is an integer of 1 to 4, and m is an integer of 1 to 100.

12. The polymer according to claim 2, wherein the functional group represented by $—Si[OSi(R)_3]_n[R']_{3-n}$ is $—Si[OSi(CH_3)_3]_3$.

13. The polymer according to claim 2, wherein the polymerizable monomer (a2-1) is a compound represented by the following formula (a2-1):

(a2-1)

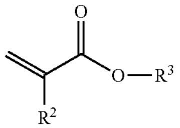

wherein, in the formulae (a2-1), $R^2$ represents a hydrogen atom or a methyl group, and $R^3$ represents an alkyl group having 1 to 18 carbon atoms.

14. The polymer according to claim 3, wherein the polymerizable monomer (a2-1) is a compound represented by the following formula (a2-1):

(a2-1)

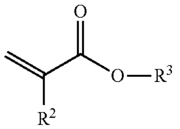

wherein, in the formulae (a2-1), $R^2$ represents a hydrogen atom or a methyl group, and $R^3$ represents an alkyl group having 1 to 18 carbon atoms.

15. The polymer according to claim 2, which is free of a fluorine atom.

16. The polymer according to claim 3, which is free of a fluorine atom.

17. The polymer according to claim 2, wherein a content ratio of the polymer block (A1) is 5% by mass or more and 95% by mass or less with respect to a total amount of the polymer.

18. The polymer according to claim 3, wherein a content ratio of the polymer block (A1) is 5% by mass or more and 95% by mass or less with respect to a total amount of the polymer.

19. The polymer according to claim 2, which has a number average molecular weight in a range of 1,000 to 500,000.

20. An article comprising:

the polymer according to claim 2.

21. The coating composition according to claim 8, wherein n of (a1) is 3.

22. The resist composition according to claim 9, wherein n of (a1) is 3.

23. The resist composition according to claim 9, wherein n of (a2-2) is 3 or 4.

* * * * *